(12) United States Patent
Guo et al.

(10) Patent No.: US 11,429,112 B2
(45) Date of Patent: Aug. 30, 2022

(54) MOBILE ROBOT CONTROL METHOD, COMPUTER-IMPLEMENTED STORAGE MEDIUM AND MOBILE ROBOT

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Dejun Guo, Pasadena, CA (US); Dan Shao, Pasadena, CA (US); Yang Shen, Los Angeles, CA (US); Kang-Hao Peng, Pasadena, CA (US); Huan Tan, Pasadena, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 88 days.

(21) Appl. No.: 17/138,946

(22) Filed: Dec. 31, 2020

(65) Prior Publication Data
US 2022/0206509 A1 Jun. 30, 2022

(51) Int. Cl.
*G06K 9/00* (2022.01)
*G05D 1/02* (2020.01)

(52) U.S. Cl.
CPC ......... *G05D 1/0253* (2013.01); *G05D 1/0223* (2013.01)

(58) Field of Classification Search
CPC ... G06T 3/0018; G06T 3/4038; G06T 15/205; G06T 2207/10016; G06T 2207/20221; G06T 3/0062; G06T 3/0093; G06T 15/20; G06T 17/00; G06T 17/20; G06T 19/20; G06T 2207/10024; G06T 2207/10028; G06T 2207/30244; G06T 3/00; G06T 7/292; G06T 7/33; G06T 7/55; G06T 13/40; G06T 15/00; G06T 17/05; G06T 17/10; G06T 19/006; G06T 2200/04; G06T 2200/16; G06T 2200/32; G06T 2207/10021; G06T 2207/10044; G06T 2207/10052; G06T 2207/20212;
(Continued)

(56) References Cited

U.S. PATENT DOCUMENTS 10,325,391 B2 * 6/2019 Forutanpour ........... G06F 3/012
10,915,114 B2 * 2/2021 Ebrahimi Afrouzi ... G01S 17/48
(Continued)

*Primary Examiner* — Masud Ahmed

(57) ABSTRACT

A mobile robot control method includes: acquiring a first image that is captured by a camera on a robot when the robot is in a desired pose; acquiring a second image that is captured by the camera on the robot when the robot is in a current pose; extracting multiple pairs of matching feature points from the first image and the second image, and projecting the extracted feature points onto a virtual unitary sphere to obtain multiple projection feature points, wherein a center of the virtual unitary sphere is coincident with an optical center of coordinates of the camera; acquiring an invariant image feature and a rotation vector feature based on the multiple projection feature points, and controlling the robot to move until the robot is in the desired pose according to the invariant image feature and the rotation vector feature.

20 Claims, 11 Drawing Sheets

(58) Field of Classification Search
CPC . G06T 2207/20228; G06T 2207/30208; G06T 2210/12; G06T 2210/44; G06T 2210/56; G06T 2215/16; G06T 2219/024; G06T 2219/2021; G06T 3/0012; G06T 3/0031; G06T 3/0043; G06T 3/005; G06T 3/0068; G06T 3/40; G06T 3/60; G06T 7/00; G06T 7/246; G06T 7/38; G06T 7/50; G06T 7/557; G06T 7/593; G06T 7/70; G06T 7/73; G06T 7/97; B25J 9/1692; B25J 9/1697; G06V 10/10; G06V 10/16; G06V 40/10

See application file for complete search history.

(56) References Cited

U.S. PATENT DOCUMENTS

| | | | |
|---|---|---|---|
| 2012/0106828 A1* | 5/2012 | Yoon | G06V 20/10 |
| | | | 382/153 |
| 2017/0078653 A1* | 3/2017 | Bi | G06T 19/006 |
| 2018/0243912 A1* | 8/2018 | Deng | B25J 9/1692 |
| 2019/0035100 A1* | 1/2019 | Ebrahimi Afrouzi | G06T 7/344 |

\* cited by examiner

MOBILE ROBOT CONTROL METHOD, COMPUTER-IMPLEMENTED STORAGE MEDIUM AND MOBILE ROBOT

TECHNICAL FIELD

The present disclosure generally relates to mobile robots, and particularly to an image-based regulation method for controlling a mobile robot without pose measurements and a mobile robot.

BACKGROUND

Ground mobile robots are being actively developed in areas including logistics, search and rescue, surveillance, etc. to perform a variety of repetitive and dangerous activities. The adjustment control of many ground mobile robots is mainly performed under the Cartesian coordinate system. That is, the outputs of the system are metric coordinates (along the x-axis and y-axis) and angles measured in degrees or radians (around the z-axis). This requires that the measurement information collected by sensors must be used in the control calculation. However, commonly used distance sensors, such as lidar, RGB-D, and stereo cameras, are expensive and bulky.

The relative pose of a robot can be reconstructed with a monocular camera. However, the pose reconstruction based on the monocular camera requires prior knowledge of the target model and replies on the pose estimation, while the prior knowledge of the target model is not always available. In addition, the computation required for pose estimation is extremely complicated.

Therefore, there is a need to provide an image-based mobile robot control method for controlling a mobile robot without pose measurements.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
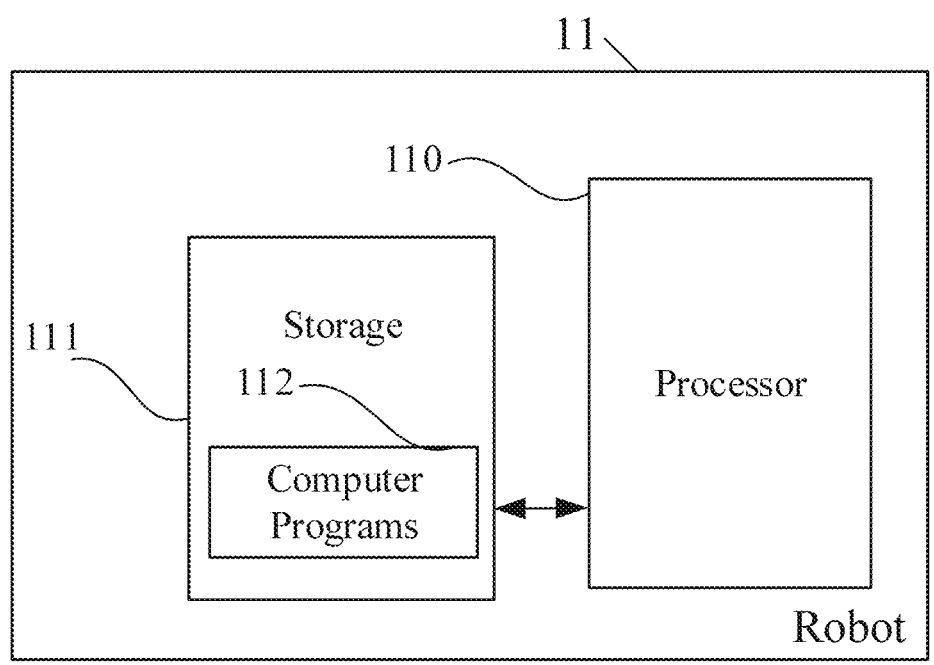
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 is a schematic block diagram of a robot 11 according to one embodiment. The robot 11 may be a mobile robot. The robot 11 may include a processor 110, a storage 111, and one or more computer programs 112 stored in the storage 111 and executable by the processor 110. When the processor 110 executes the computer programs 112, the steps in the embodiments of the method for controlling the robot 11, such as steps S41 through S44 in FIG. 5, steps S51 through S56 in FIG. 6, steps S551 through S56 in FIG. 10, and steps S561 through S566 in FIG. 11, are implemented.

Exemplarily, the one or more computer programs 112 may be divided into one or more modules/units, and the one or more modules/units are stored in the storage 111 and executed by the processor 110. The one or more modules/units may be a series of computer program instruction segments capable of performing specific functions, and the instruction segments are used to describe the execution process of the one or more computer programs 112 in the robot 11.

The processor 110 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 111 may be an internal storage unit of the robot 11, such as a hard disk or a memory. The storage 111 may also be an external storage device of the robot 11, such as a plug-in hard disk, a smart memory card (SMC), and a secure digital (SD) card, or any suitable flash cards. Furthermore, the storage 111 may also include both an internal storage unit and an external storage device. The storage 111 is used to store computer programs, other programs, and data required by the robot. The storage 111 can also be used to temporarily store data that have been output or is about to be output.

Figure 2:
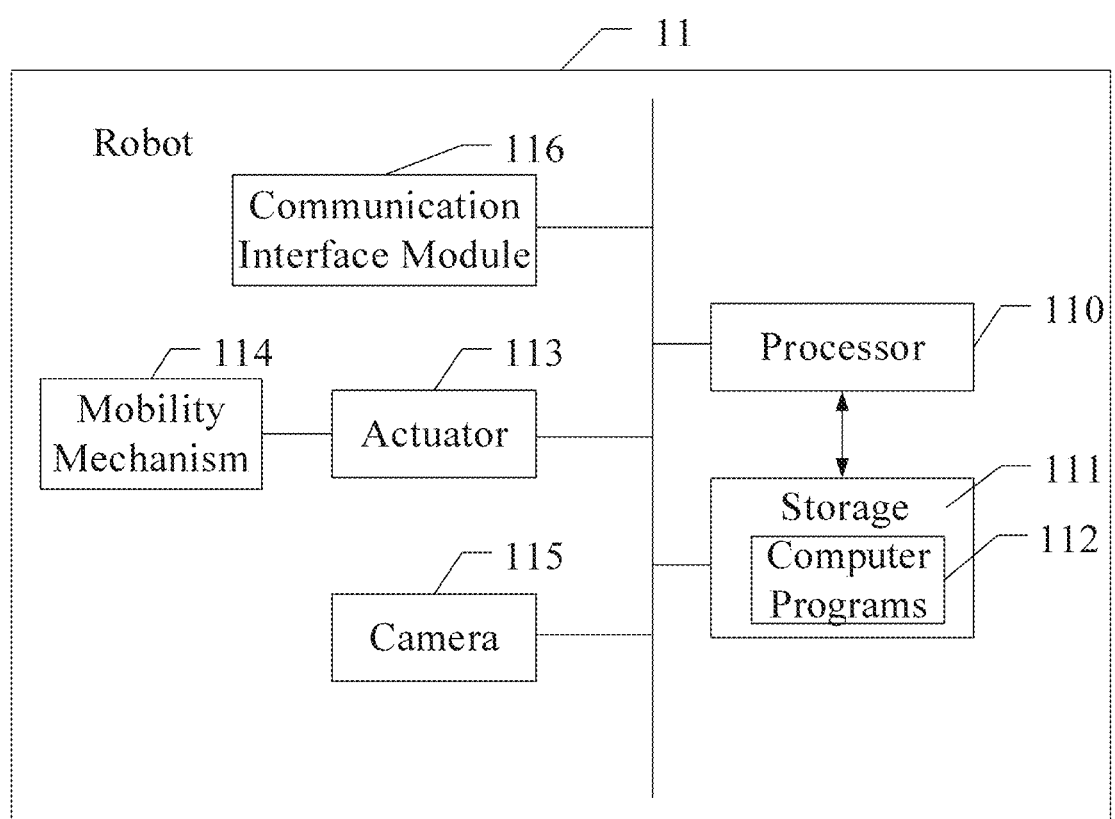
FIG. 2 is a schematic block diagram of a robot according to another embodiment.
Figure 3:
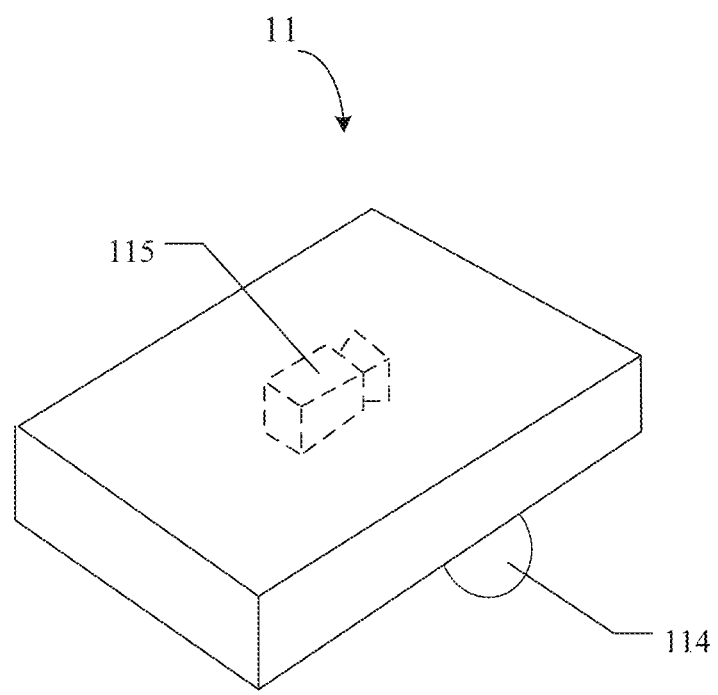
FIG. 3 is a schematic isometric view of a wheeled robot according to one embodiment.

It should be noted that FIG. 1 is merely an example of the robot 11, and does not limit the robot 11. The robot 11 may include components different in numbers from those illustrated, or incorporate some other different components. For example, in one embodiment as shown in FIGS. 2 and 3, the robot 11 may further include an actuator 113, a mobility mechanism 114, a camera 115, and a communication interface module 106. The robot 11 may further include an input and output device, a network access device, a bus, and the like.

In one embodiment, the actuator 113 may include one or more motors and/or servos. The mobility mechanism 114 may include one or more wheels and/or tracks. The actuator 113 is electrically coupled to the mobility mechanism 114 and the processor 110, and can actuate movement of the mobility mechanism 114 according to commands from the processor 110. The camera 115 may be, for example, a camera mounted on the robot 11. The camera 115 is electrically coupled to the processor 110 and is configured to transmit captured images to the processor 110. The communication interface module 116 may include a wireless transmitter, a wireless receiver, and computer programs executable by the processor 110. The communication interface module 116 is electrically connected to the processor 103 and is configured for communication between the processor 110 and external devices. In one embodiment, the processor 110, storage 111, actuator 113, mobility mechanism 114, camera 115, and communication interface module 116 may be connected to one another by a bus.

Figure 4:
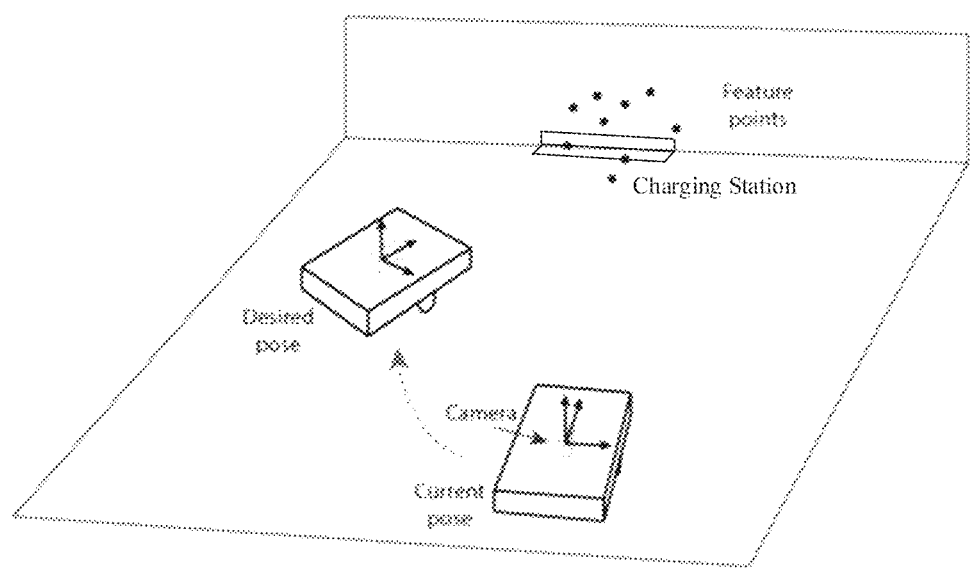
FIG. 4 shows a scenario where a robot can be controlled to dock into a charging station.

In one embodiment, the robot 11 can observe outlets in a wall for auto charging, goods on a shelf for picking up, and furniture indoors for home service. FIG. 4 shows an exemplary scenario where the robot 11 is able to automatically dock into a charging station for executing an auto-charging process. Before controlling the robot 11 to self-charge, the robot 11 is first parked in front of the charging station and is caused to face the charging station. The pose of the robot 11 at this time is used as a desired pose, and the image of the environment in front of the robot 11 at this time is captured as a desired image. Then, when the robot 11 needs to be charged, no matter what kind of pose the robot 11 is in, the current pose is used as an initial pose, and the image of the environment in front of the robot 11 is captured as a current image. The robot 11 is then controlled to move and rotate to the desired pose based on the feature points in the desired image and the current image, by executing the steps in a control method provided in the following embodiments.

Figure 5:
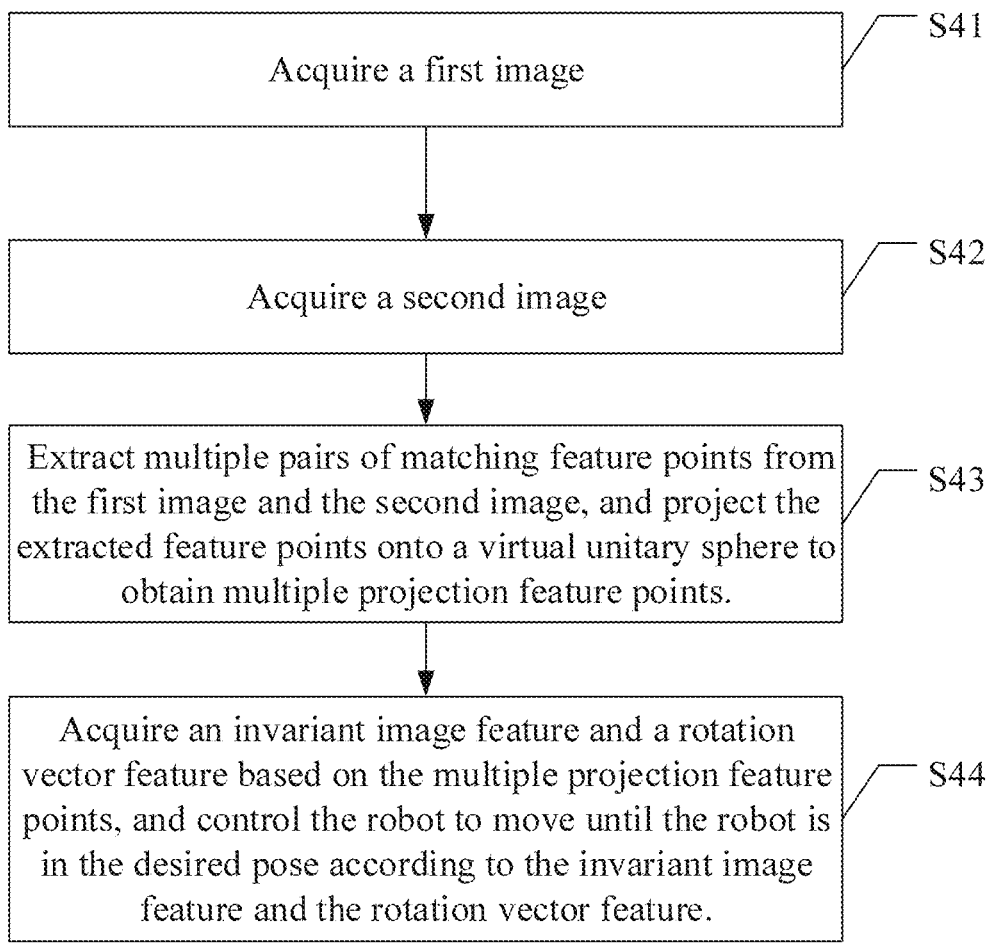
FIG. 5 is a schematic flowchart of a mobile robot control method according to one embodiment.

FIG. 5 shows a flowchart of a mobile robot control method according to one embodiment. The method may be used to control the robot 11 of FIGS. 1-3 to move. The method may be executed by one or more processors of the robot or one or more processors of other control devices electrically coupled to the robot. The control devices may include, but are not limited to: desktop computers, tablet computers, laptop computers, multimedia players, servers, smart mobile devices (such as smart phones, handheld phones, etc.) and smart wearable devices (such as smart watches, smart glasses, smart cameras, smart bands, etc.) and other computing devices with computing and control capabilities. In one embodiment, the method may include steps S41 to S44.

Step S41: Acquire a first image that is captured by a camera on the robot when the robot is in a desired pose.

Step S42: Acquire a second image that is captured by the camera on the robot when the robot is in a current pose.

Step S43: Extract multiple pairs of matching feature points from the first image and the second image, and project the extracted feature points onto a virtual unitary sphere to obtain multiple projection feature points.

The virtual unitary sphere is a unified spherical model that uses a combination of virtual sphere and perspective projection to simulate a central imaging system. The center of the virtual unitary sphere is coincident with an optical center of coordinates of the camera. The multiple pairs of matching feature points extracted from the first image and the second image are projected onto the virtual unitary sphere, and the corresponding projection points on the unitary sphere are the projection feature points.

Step S44: Acquire an invariant image feature and a rotation vector feature based on the multiple projection feature points, and control the robot to move until the robot is in the desired pose according to the invariant image feature and the rotation vector feature.

In one embodiment, the invariant image feature may include one or more of a reciprocal of a distance between two of the projection feature points, an image moment, and an area. The rotation vector feature can be an angle vector or a direction vector. Controlling the robot to move includes controlling the robot to translate and controlling the robot to rotate.

Figure 6:
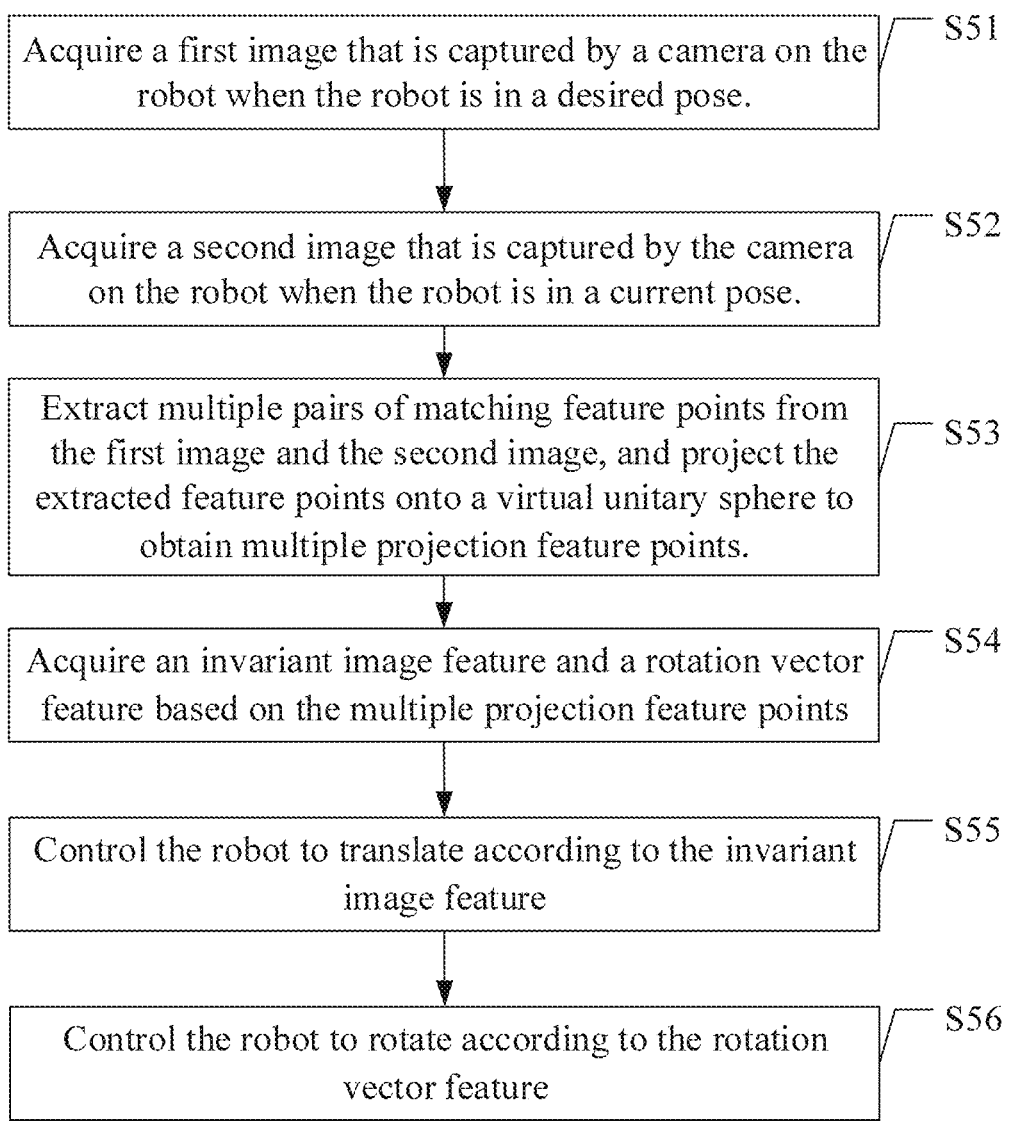
FIG. 6 is a schematic flowchart of a mobile robot control method according to another embodiment.

FIG. 6 shows a flowchart of a mobile robot control method according to another embodiment. The method may be used to control the robot 11 of FIGS. 1-3 to move. The method may be executed by one or more processors of the robot or one or more processors of other control devices electrically coupled to the robot. The control devices may include, but are not limited to: desktop computers, tablet computers, laptop computers, multimedia players, servers, smart mobile devices (such as smart phones, handheld phones, etc.) and smart wearable devices (such as smart watches, smart glasses, smart cameras, smart bands, etc.) and other computing devices with computing and control capabilities. In one embodiment, the method may include steps S51 to S56.

Step S51: Acquire a first image that is captured by a camera on the robot when the robot is in a desired pose.

In one embodiment, the desired pose may include a desired position and a desired orientation of the robot. The robot is expected to move to the desired position and be in the desired orientation. The robot can be controlled (e.g., by a user) to stop at the desired position and in a desired orientation such that an image of the environment (e.g., a wall having an outlet) in front of the robot can be captured by a camera mounted on the robot as the first image (i.e., desired image). When the robot is stopped at the desired position and in the desired orientation, the environment in the field of view of the robot is required to include at least three feature points. The camera of the robot can be a fisheye pinhole camera or a non-pinhole camera, such as a catadioptric camera.

Step S52: Acquire a second image that is captured by the camera on the robot when the robot is in a current pose.

When it needs to control the robot to move to the desired position and be in the desired orientation, a current image of the environment in front of the robot is captured by the camera mounted on the robot as the second image (i.e., the current image). When the second image is captured, the environment in the field of view of the robot is required to include at least three feature points.

Step S53: Extract multiple pairs of matching feature points from the first image and the second image, and project the extracted feature points onto a virtual unitary sphere to obtain multiple projection feature points. The center of the virtual unitary sphere is coincident with an optical center of coordinates of the camera.

In one embodiment, the extraction of the multiple pairs of matching feature points from the first image and the second image can be achieved in a manner as follows.

First, a first number of original feature points are extracted from each of the first image and the second image using a scale-invariant feature transform (SIFT) descriptor. Then, a second number of pairs of matching feature points are acquired by comparing and matching the extracted original feature points.

For example, 200 SIFT feature points from any position in the first image, and 200 SIFT feature points from any position in the second image can be extracted using the SIFT descriptor. Then, the extracted 400 (200 pairs) SIFT feature points can be compared and matched using a closest euclidean distance algorithm to obtain at least 3 pairs of matching feature points. Optionally, in the process of comparison and matching, a balanced binary search tree, such as KDTree, can be used to speed up the search process.

It should be noted that there is no restriction on the position of the above-mentioned feature points. That is, these feature points can be coplanar or non-coplanar, and the plane on which these feature points are located can be perpendicular to or not perpendicular to a plane of motion.

One goal of the present disclosure is to adjust the pose of the robot based on the visual feedback of at least three non-collinear static feature points in the first image, and make it independent of the pose requirements of the robot relative to the inertial reference system or the visual target. In order to achieve this goal, it is necessary to project multiple pairs of matching feature points extracted from the first image and the second image onto the unitary sphere.

Figure 7:
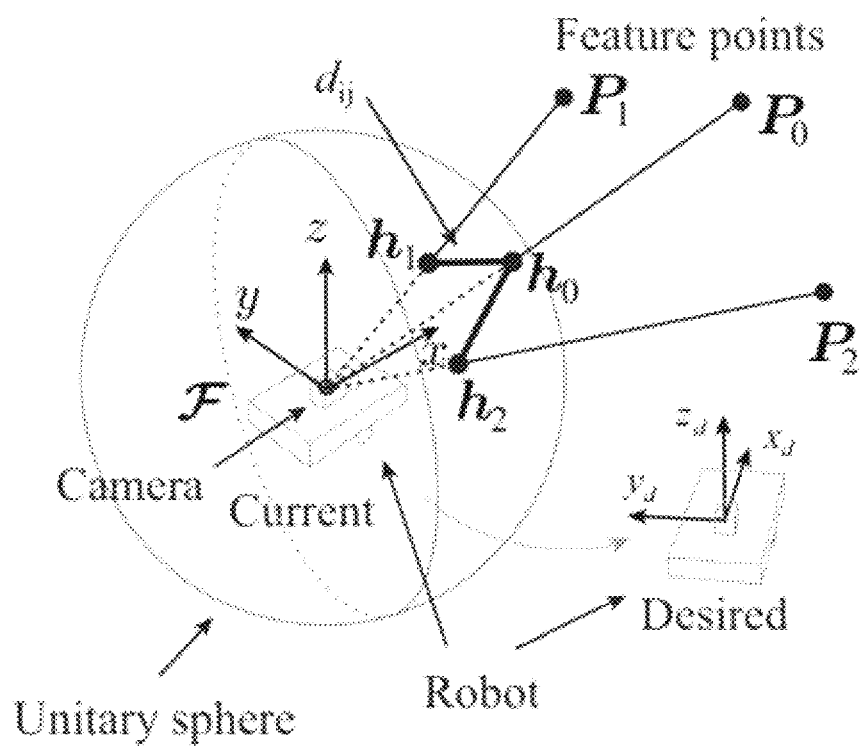
FIG. 7 is a schematic diagram of a virtual unitary sphere where feature points are projected.

Referring to FIG. 7, in one embodiment, the camera mounted on the robot is a calibrated forward onboard camera with a coordinate system F, and the coordinates of the robot the coordinates of the camera are the same. The robot moves on the plane shown in FIG. 7. The x-axis and the y-axis in the coordinate system F define the motion plane, in which the positive direction of the x-axis is the travelling direction of the robot, and the y-axis is coincident with the axis around which the wheels of the robot rotate. A point $P_i$ in the coordinate system F is projected onto the virtual unitary sphere and is represented by $h_i$. The virtual unitary sphere is a unified spherical model that uses a combination of virtual sphere and perspective projection to simulate a central imaging system.

Step S54: Acquire an invariant image feature and a rotation vector feature based on the multiple projection feature points.

The invariant image feature is a class of image features which is invariant to rotation of the camera. The invariant image feature $S \in \Re^2$ serves as the system outputs to represent the translational motions of the robot, $\Re^2$ represents a two-dimensional real coordinate space. The dynamic model of the invariant image feature needs to satisfy the following formula: $\dot{s}=Jv$, where $J \in \Re^{2\times 2}$ is an interaction matrix, $v=[v_x, v_y]^T$ represents the linear velocity of the robot in the coordinate system F, which is not restricted by non-integrity constraints. The acceleration of the robot coordinate system satisfies $a \in \Re^2$. It should be noted that the formula $\dot{s}=Jv$ is independent of the angular velocity $\omega$ of the robot represented by the z-axis of the coordinate system F.

In one embodiment, the invariant image feature may include one or more of a reciprocal of a distance between two of the projection feature points, an image moment, and an area.

In an example as shown in FIG. 7, the reciprocal of a distance $d_{ij}$ between projection feature points $h_i$ and $h_j$ is used as the invariant image feature because the reciprocal has the best linearization characteristics between a task space and an image space. Points $h_i$ and $h_j$ represent the projection of feature points extracted from the same image on the unitary sphere, such as the projection feature points corresponding to feature points $P_i$ and $P_j$ in FIG. 7. That is, points $h_i$ and $h_j$ may represent the projection of feature points extracted from the second image (i.e., current image) on the unitary sphere. The points $h_i$ and $h_j$ may represent the projection of feature points extracted from the first image (i.e., desired image) on the unitary sphere. It should be noted that two projection feature points can be connected to each other to form a small line segment. The closer the robot is to the desired position, the longer the line segments are. The goal of translation control is to make the selected line segments equal to the desired values. For example, assuming that there are three projection feature points, i=0, 1, 2; j=0, 1, 2; and i—j, there are 3 combinations (0,1)(0,2)(1,2), two of which can be used.

Assume a static feature point, where $y_i=[y_{i1},y_{i2}]^T$ measured in pixel points represents the homogeneous coordinates of a feature point extracted from the image plane, and i represents a positive integer greater than 0. Construct an imaginary image plane that can be called the retina, which is associated with an imaginary perspective camera. The corresponding coordinates in the retina can be obtained according to the following formula: $r_i=[r_{i1},r_{i2},1]_T=A^{-1}y_i$, where A represents the generalized-camera projection matrix related to mirror and camera intrinsic parameters. The projection feature points projected on the unitary sphere can be obtained according to the following formulas: $h_i=\gamma[r_{i1},r_{i2},1-\xi/\gamma]^T$; $\gamma=(\xi+\mu(r_i)/\|r_i\|^2$; and $\mu(r_i)=\sqrt{1+(1-\xi^2)(\|r_i\|^2-1)}$, where $\xi$ characterizes the type of mirrors or lenses used. When $\xi$ is equal to 0, the unified model corresponds to a perspective camera and A represents the camera's intrinsic matrix.

Based on the above principle, at least 3 pairs of feature points extracted from the real environment represented by the desired image and the current image are projected onto the virtual unitary sphere with $h_i$ points. The corresponding invariant image feature can be obtained according to the following formula: $S=[1/d_{01},1/d_{02}]^T$, where $s \in \Re^2$, $d_{01}$ represents the distance between the projected feature points $h_0$ and $h_1$ on the unitary sphere, $d_{02}$ represents the distance between the projected feature points $h_0$ and $h_2$ on the unitary sphere. At this time, the corresponding interaction matrix is $J=[J_1^T,J_2^T]^T$ with $$J_i = -\frac{1}{d_{0i}^3}\left(\frac{1}{\|P_0\|}h_i^T\Gamma_0 + \frac{1}{\|P_i\|}h_0^T\Gamma_i\right),$$

where $\Gamma_j=(I-h_jh_j^T)I_{12}$, j=0,1,2, I is the identity matrix, $I_{12}$ represents the first two columns of the identity matrix I. The distance $P_j$ from the projected feature points on the unitary sphere to the origin are generally unknown. In the embodiment, they can be replaced by a constant value closed to the desired one. Experiments show that the closed-loop system is stable with this approximation.

In one embodiment, if the image moment is used as the invariant image feature, the invariant image feature can be obtained according to the following formula:

$$I = m_{200}m_{020} - m_{200}m_{002} + m_{110}^2 + m_{101}^2 - m_{020}m_{002} + m_{011}^2,$$

$$\text{where } m_{i,j,k} = \sum_{l=1}^n x_l^i, y_l^j, z_l^k,$$

which represents a (i+j+k)-order central moment of the image.

In one moment, if an area is used as the invariant image feature, the invariant image feature can be obtained according to the following formula:

$$\Delta = \frac{1}{2}\|(h_1 - h_0) \times (h_2 - h_0)\|,$$

where $h_i=(x_i, y_i, z_i)$, which represents the three-dimensional coordinates of the i-th projection feature point on the unitary ball.

Figure 8:
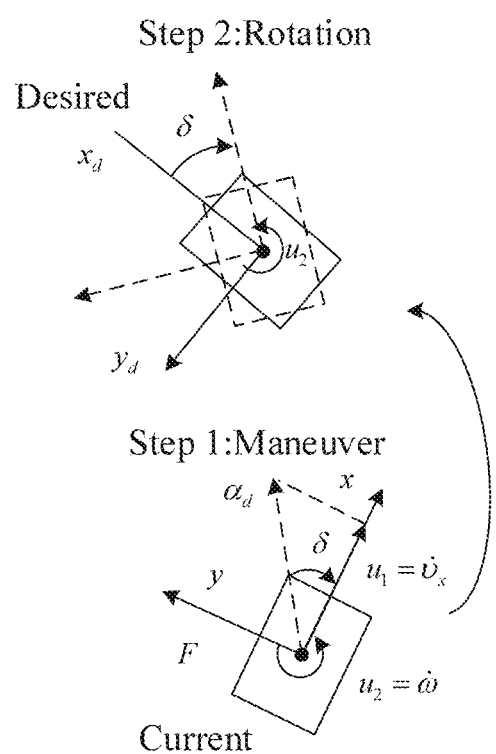
FIG. 8 shows system inputs at the acceleration level according to one embodiment.

In one embodiment, the mobile robot is a unicycle-like vehicle under the nonholonomic constraint. The linear velocity in the camera coordinate system F is $\upsilon=[\upsilon_x, 0]^T$. In conjunction with FIG. 8, the system inputs at the acceleration level are defined as $u_1=\dot{\upsilon}_x$ and $\mu_2=\dot{\omega}$, where x and $x_d$ represent the actual x-axis and the desired x-axis. The translational dynamics is obtained according to the following formula: $\dot{\upsilon}=\alpha=u_1 x$, where $x=[1,0]^T$, which represents the x-axis of the coordinate system F. The image error of invariant features can be obtained according to the following formula: $e_s=s-s_d$, where $S_d$ represents the desired values calculated from the desired image.

In one embodiment, when used for movement control adjustment, $\dot{s}_d=0$, and the error kinematics can be expressed by $\dot{e}_s=J\upsilon$. Multiplying $J^{-1}$ on both sides of the formular above and taking time derivative of it yields $\alpha=J^{-1}\ddot{e}_{s+J^{-1}\dot{s}}$. Then replacing $\alpha$ in the formula $\dot{\upsilon}=\alpha=u_1 x$ with the result results in the following translational dynamics of the camera-robot system: $\ddot{e}_s=Ju_1 x - J\dot{J}^{-1}\dot{S}$.

Robustness can be improved by using all the projection feature points obtained by the projection to calculate the rotation vector feature. Since the calculated rotation vector feature provide a direct mapping between the rotational velocities and the rate of rotation vector, a better characteristic can be achieved.

It should be noted that no matter which of the distance, image moment, and area the invariant image feature is, the rotation vector feature remains the same, which can be calculated according to the following formula $\delta=-\arctan(\alpha_{dy}/\alpha_{dx})$, $\alpha_{dx}\neq 0$. The calculation principle is: Calculate the acceleration direction of the robot according to the formula $a_d=-J^{-1}(k^S e_s+k_\upsilon \dot{e}_S)+J^{-1}\dot{S}$, and then calculate the angle between the acceleration direction $\alpha_d$ and the x-axis of the robot coordinate system F. The angle is the rotation vector feature $\delta$ in the formula $\delta=-\arctan(\alpha_{dy}/\alpha_{dx})$, $\alpha_{dx}\neq 0$. In addition, the orientation dynamics can be obtained according to the following formulas: $\dot{\delta}=\omega$, $\dot{\omega}=u_2$, where $\delta$ represents the orientation difference from the desired direction to the x-axis, and $\omega$ represents the angular velocity.

Step S55: Control the robot to translate according to the invariant image feature.

Step S56: Control the robot to rotate according to the rotation vector feature.

Figure 9:
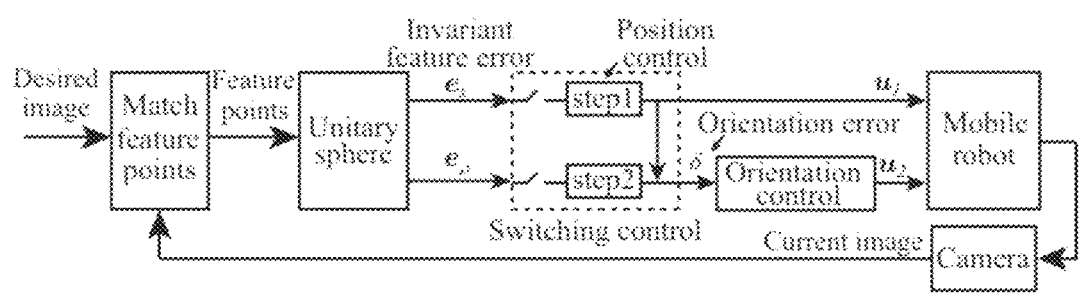
FIG. 9 shows an image-based switching control scheme using invariant features.

It should be noted that the motion of the robot is a rigid body motion, which can be decomposed into a rotational motion and a translational motion. In conjunction with FIG. 9, in the embodiment, the adjustment of the pose of the robot requires a switching control between two steps. The first step is to use the invariant image feature to control the robot to translate. The goal is to eliminate the translational error (also referred to as the invariant feature error), that is, the goal is to render the translational error to be equal to 0. The second step is to use the rotation vector feature to control the robot to rotate after the translational error has been eliminated.

The goal is to eliminate the orientation error, that is, render the orientation error to be equal to 0.

In the first step above, the invariant image feature S is used to represent the translation state, so even if the desired pose cannot be obtained, the robot can still be controlled to translate. The orientation is decoupled from the position control by using the invariant image feature S. In the position control, the desired acceleration $\alpha_d=[\alpha_{dx}, \alpha_{dy}]^T$ generated by reducing $e_S$.

In the second step, the orientation control is to align the x-axis with the direction of $\alpha_d$. For example, the desired x-axis satisfies $x_d=\alpha_d/\|\alpha_d\|$. After the convergence of $e_S$, the robot is controlled to rotate to align the centroid of the projected feature points on the unitary sphere with the desired value.

Figure 10:
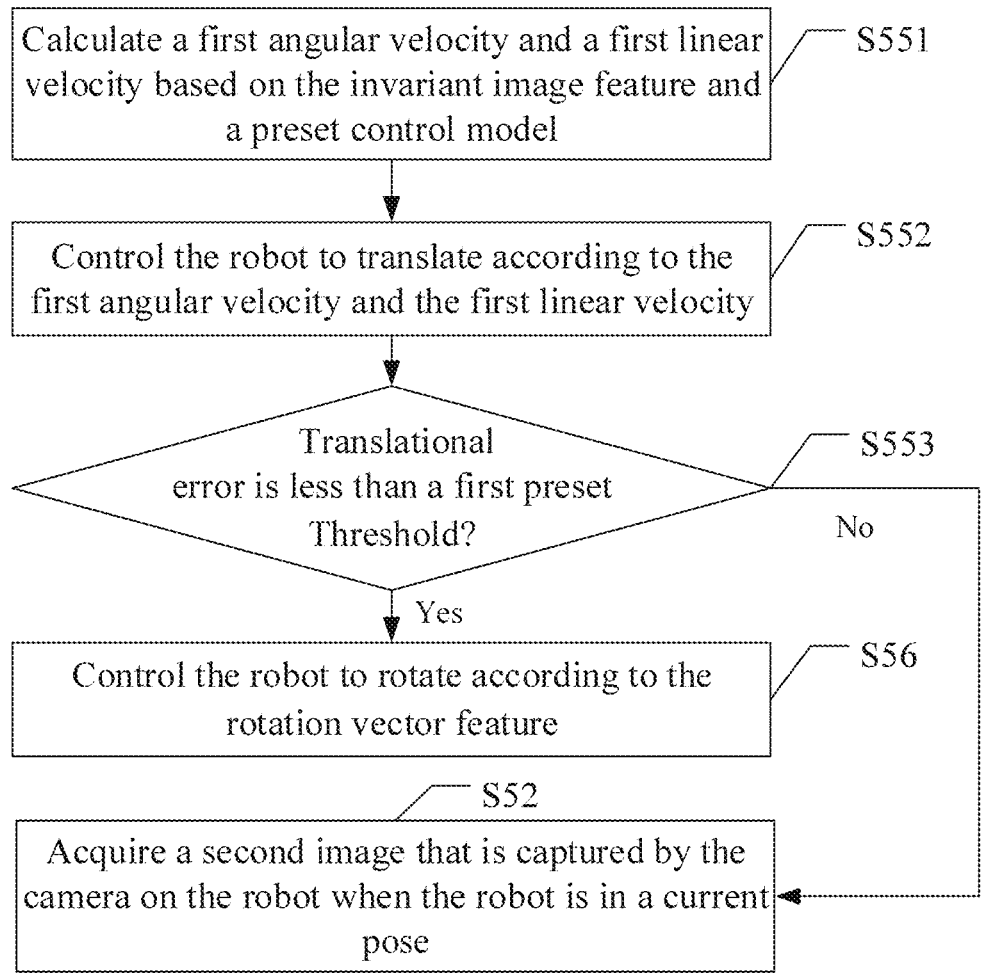
FIG. 10 is a schematic flowchart of a method for controlling a robot to translate according to one embodiment.
Figure 11:
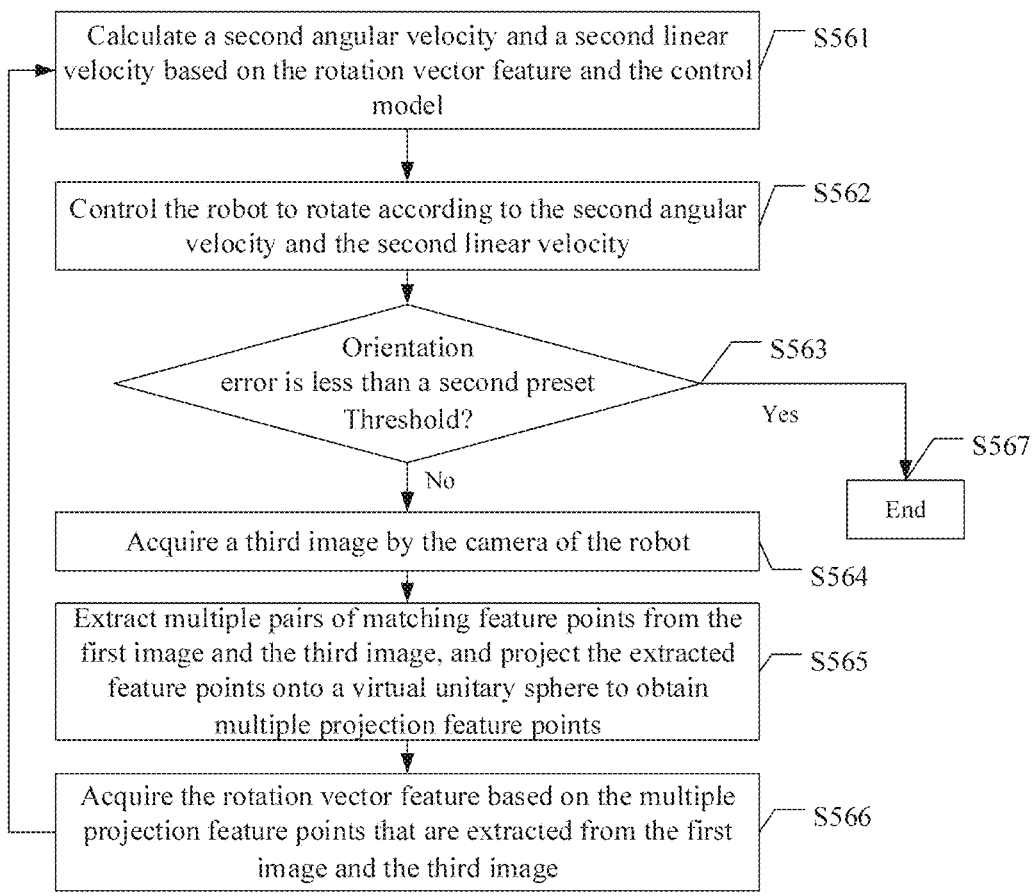
FIG. 11 is a schematic flowchart of a method for controlling a robot to translate according to one embodiment.

Referring to FIG. 10, in one embodiment, the first step (i.e., step S55) may include the following steps.

Step S551: Calculate a first angular velocity and a first linear velocity based on the invariant image feature and a preset control model.

Step S552: Control the robot to translate according to the first angular velocity and the first linear velocity.

Step S553: Determine whether a translational error is less than a first preset threshold.

If the translational error is less than the first preset threshold, the procedure goes to step S56 of controlling the robot to rotate according to the rotation vector feature.

If the translational error is greater than or equal to the first preset threshold, it means that the translational error has not been eliminated, the robot has not reached the desired position, and the robot needs to continue to translate toward the desired position. The procedure then goes back to the step S52 of acquiring the second image. The steps S551, S552, S553, and S52 are repeated until the translational error is less than the first preset threshold, and then the second step of controlling the orientation of the robot is started.

The goal of the first step above is to ensure the convergence of $e_S$. In the first step, based on the invariant image feature and the preset control model, the steps S551 to S553 above may be implemented according to the formula $e_S=S-S_d$ and the following formulas: $u_1=\alpha_d^T x$; $\alpha_d=-J^{-1}(k_s e_s+k_\upsilon \dot{e}_S)+J^{-1}\dot{S}$; $u_2=-k_{67}\delta-k_{107}\omega$; and $\delta=-\arctan(\alpha_{dy}/\alpha_{dx})$, $\alpha_{dx}\neq 0$, where $k_s$, $k_\upsilon$, $k_\delta$, and $k\omega$ represent positive control gains. Assume that the singularity of J won't be reached. $\delta$ is well defined when $\|\alpha_d\|\neq 0$ and $\alpha_{dx}\neq 0$. This is because $\|\alpha_d\|=0$ only happens when translational errors are 0 at the end of the first step, and $\delta\neq \pm\pi/2$ is one of sufficient conditions for the stability of the camera-robot system.

The first angular velocity used to control the translation of the robot can be obtained by according to the formula $u_2=-k_\delta\delta-k_\omega\omega$. The first linear velocity can be obtained according to the formula $u_1=\alpha_d^T x$. The formula $e_S=S-S_d$ can be used to determine whether the translational errors are zero.

According to the formulas above, it can be found that in the process of position control in the first step, the robot's trajectory is not a straight line, but a curve. That is to say, in the process of controlling the translation of the robot through the first step, not only the amplitude of the robot's movement is adjusted, but the orientation of the robot is also adjusted accordingly to enable it to move toward the desired position.

When calculating $\delta$ according to the formula $\delta=-\arctan(\alpha_{dy}/\alpha_{dx})$, $\alpha_{dx}\neq 0$, the direction of $\alpha_d$ will be flipped over $\pi$ if $\alpha_{dx}<0$. This design is to ensure that the robot is able to move backward and keeps the visual target in the front if the goal is at the back. It helps keeping the visual target in the field of view (FOV) of the camera if the FOV is limited.

Referring to FIG. 11, in one embodiment, the second step (i.e., step S56) may include the following steps.

Step S561: Calculate a second angular velocity and a second linear velocity based on the rotation vector feature and the control model.

Step S562: Control the robot to rotate according to the second angular velocity and the second linear velocity.

Step S563: Determine whether an orientation error of the robot after rotation of the robot is less than a second preset threshold.

Step S564: If the orientation error of the robot is greater than or equal to the second preset threshold, it means that the orientation error has not been eliminated and the robot is not in the desired orientation. In this case, acquire a third image by the camera of the robot.

Step S565: Extract multiple pairs of matching feature points from the first image and the third image, and project the extracted feature points onto a virtual unitary sphere to obtain multiple projection feature points.

Step S566: Acquire the rotation vector feature based on the multiple projection feature points that are extracted from the first image and the third image, and then the procedure goes back to the step S561 of calculating the second angular velocity and the second linear velocity based on the rotation vector feature and the control model. Steps S551, S552, S553, and S56 are repeated until the orientation error is less than the second preset threshold.

Step S567: If the orientation error is less than the second preset threshold, it means that the orientation error has been eliminated and the robot is in the desired orientation, and the procedure ends.

In one embodiment, steps S561 to S567 can be implemented based on the rotation vector feature and the control model according to the following formulas: $u_1=0$; $u_2=-k_\delta\delta-k_\omega\omega$; and $\delta=\text{sgn}(e_\rho\times\rho\cdot e_3)\|e_{92}\|$, where $e_3=[0,0,1]^T$ represents the z-axis, $$\rho = \sum_{i=1}^{n} h_i/n$$

represents centroict of n feature points.

The second angular velocity $\omega$ used to control the rotation of the robot can be obtained according to the formula $u_2=-k_\delta\delta-k_\omega\omega$. The second linear velocity can be obtained according to the formula $u_1=0$, and the linear velocity at this stage is equal to 0. The orientation error $\delta$ can be calculated according to the formula $\delta=\text{sgn}(e_\rho\times\rho\cdot e_3)\|e_\rho\|$.

In one embodiment, the invariant image feature can be determined based on a combination of two or all of the distance, image moment, and area. Specifically, an average value of the at least two of the distance between two of the projection feature points, the image moment, and the area, and the average value is used as the invariant image feature. The invariant image feature is then substituted into the formulas above to realize the position control of the robot. In this way, multiple parameters are combined to determine the invariant characteristics of the final application, thereby improving the accuracy of the control results.

In one aspect, the image features in the image coordinate system are used to replace the distance and angle defined in the Cartesian coordinate system to represent the kinematics/dynamics of the mobile robot. Only one camera is required, instead of relying on the use of conventional expensive and bulky sensors (such as: lidars, sonars, wheel odometers, etc.) to perform the mobility control of the robot, which can reduce the manufacturing cost of the robot, and enable the robot to have a reduced size.

In another aspect, since the invariant image feature and the rotation vector feature are used to determine the desired pose of the robot, neither the prior knowledge of the target model nor the estimation of the robot's pose relative to the target are required. That is, there is no need to calculate and decompose the homography or essential matrix, so the complexity of the computation can be reduced, and the computation speed can be improved.

In yet another aspect, since the feature points in the desired image and the current image can be selected arbitrarily, there is no requirement on the physical location of the points in the environment. For example, the feature points in the environment can be coplanar or non-coplanar. The method can thus be applied to more scenarios, which can improve the universality of the method.

In one embodiment, a mobile robot control device can be constructed similar to the robot of FIG. 1. That is, the mobile robot control device may include a processor and a storage that is electrically coupled to the processor and stores therein one or more computer programs executable by the processor. When the processor executes the computer programs, the steps in the embodiments of the method for controlling the robot 11, such as steps S41 through S44 in FIG. 5, steps S51 through S56 in FIG. 6, steps S551 through S56 in FIG. 10, and steps s561 through s566 in FIG. 11, are implemented. The processor, storage, computer programs of the mobile robot control device can be the same as the processor 110, the storage 111, and the computer programs 112 as described above, and will not be repeated herein. The robot mobile control device can be any of various types of computer system equipment with data interaction functions, including but not limited to cellular phones, smart phones, other wireless communication devices, personal digital assistants, audio players, and other media players, music recorders, video recorders, cameras, other media recorders, radios, vehicle transportation equipments, programmable remote controls, laptop computers, desktop computers, printers, netbook computers, portable gaming devices, portable Internet devices, data storage devices, smart wearable devices (for example, head-mounted devices (HMD) such as smart glasses, smart clothes, smart bracelets, smart necklaces, or smart watches), and combinations thereof.

Exemplarily, the one or more computer programs may be divided into one or more modules/units, and the one or more modules/units are stored in the storage and executed by the processor. The one or more modules/units may be a series of computer program instruction segments capable of performing specific functions, and the instruction segments are used to describe the execution process of the one or more computer programs. For example, the one or more computer programs may be divided into a first acquiring module, a second acquiring module, a feature extracting module, a calculating module and a control module.

The first acquiring module is configured to acquire a first image that is captured by a camera on the robot when the robot is in a desired pose.

The second acquiring module is configured to acquire a second image that is captured by the camera on the robot when the robot is in a current pose.

The feature extracting module is configured to extract multiple pairs of matching feature points from the first image and the second image, and project the extracted feature points onto a virtual unitary sphere to obtain multiple projection feature points, wherein a center of the virtual unitary sphere is coincident with an optical center of coordinates of the camera.

The calculating module is configured to acquire an invariant image feature and a rotation vector feature based on the multiple projection feature points.

The control module is configured to control the robot to move until the robot is in the desired pose according to the invariant image feature and the rotation vector feature.

It should be noted that the mobile robot control device may include components different in numbers from those described above, or incorporate some other different components. For example, the mobile robot control device may further include an input and output device, a network access device, a bus, and the like.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In one embodiment, a non-transitory computer-readable storage medium that may be configured in the robot 11 or the mobile robot control device as described above. The non-transitory computer-readable storage medium may be the storage unit configured in the main control chip and the data acquisition chip in the foregoing embodiments. One or more computer programs are stored on the non-transitory computer-readable storage medium, and when the computer programs are executed by one or more processors, the robot control method described in the embodiment above is implemented.

In the embodiments above, the description of each embodiment has its own emphasis. For parts that are not detailed or described in one embodiment, reference may be made to related descriptions of other embodiments.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented method executed by one or more processors for controlling a mobile robot, the method comprising:
acquiring a first image that is captured by a camera on the robot when the robot is in a desired pose;
acquiring a second image that is captured by the camera on the robot when the robot is in a current pose;
extracting multiple pairs of matching feature points from the first image and the second image, and projecting the extracted feature points onto a virtual unitary sphere to obtain multiple projection feature points, wherein a center of the virtual unitary sphere is coincident with an optical center of coordinates of the camera;
acquiring an invariant image feature and a rotation vector feature based on the multiple projection feature points, and controlling the robot to move until the robot is in the desired pose according to the invariant image feature and the rotation vector feature.

2. The method of claim 1, wherein controlling the robot to move comprises:
controlling the robot to translate according to the invariant image feature; and
controlling the robot to rotate according to the rotation vector feature.

3. The method of claim 2, wherein controlling the robot to translate according to the invariant image feature, comprises:
calculating a first angular velocity and a first linear velocity based on the invariant image feature and a preset control model;
controlling the robot to translate according to the first angular velocity and the first linear velocity;
determining whether a translational error is less than a first preset threshold;
going back to a step of acquiring the second image if the translational error is greater than or equal to the first preset threshold; and
controlling the robot to rotate according to the rotation vector feature if the translational error is less than the first preset threshold.

4. The method of claim 2, wherein controlling the robot to rotate according to the rotation vector feature, comprises:
calculating a second angular velocity and a second linear velocity based on the rotation vector feature and the control model;
controlling the robot to rotate according to the second angular velocity and the second linear velocity;
determining whether an orientation error of the robot after rotation of the robot is less than a second preset threshold;
acquiring a third image by the camera if the orientation error of the robot is greater than or equal to the second preset threshold;
extracting multiple pairs of matching feature points from the first image and the third image, and projecting the extracted feature points onto a virtual unitary sphere to obtain multiple projection feature points; and
acquiring the rotation vector feature based on the multiple projection feature points that are extracted from the first image and the third image, and then going back to a step of calculating the second angular velocity and the second linear velocity based on the rotation vector feature and the control model.

5. The method of claim 1, wherein the invariant image feature comprises one or more of a reciprocal of a distance between two of the projection feature points, an image moment, and an area.

6. The method of claim 1, wherein acquiring the invariant image feature based on the multiple projection feature points, comprises:
acquiring at least two of a distance between two of the projection feature points, an image moment, and an area; and
calculating an average value of the at least two of the distance between two of the projection feature points, the image moment, and the area, and using the average value as the invariant image feature.

7. The method of claim 1, wherein acquiring the rotation vector feature based on the multiple projection feature points, comprises:
determining an acceleration direction of the robot based on the multiple projection feature points;
using an angle between the acceleration direction and an x-axis of a robot coordinate system as the rotation vector feature.

8. The method of claim 1, wherein extracting multiple pairs of matching feature points from the first image and the second image, comprises:
extracting a first number of original feature points from each of the first image and the second image using scale-invariant feature transform; and
acquiring a second number of pairs of matching feature points by comparing and matching the extracted original feature points.

9. The method of claim 1, further comprising:
control the robot to stop at a desired position and in a preset pose; and
using an image of an environment in front of the robot captured by the camera as the first image, wherein the environment in front of the robot comprises at least three feature points.

10. A non-transitory computer-readable storage medium storing one or more programs to be executed in a mobile robot, the one or more programs, when being executed by one or more processors of the robot, causing the robot to perform processing comprising:
acquiring a first image that is captured by a camera on the robot when the robot is in a desired pose;
acquiring a second image that is captured by the camera on the robot when the robot is in a current pose;
extracting multiple pairs of matching feature points from the first image and the second image, and projecting the extracted feature points onto a virtual unitary sphere to obtain multiple projection feature points, wherein a center of the virtual unitary sphere is coincident with an optical center of coordinates of the camera;
acquiring an invariant image feature and a rotation vector feature based on the multiple projection feature points; and controlling the robot to move until the robot is in the desired pose according to the invariant image feature and the rotation vector feature.

11. The non-transitory computer-readable storage medium of claim 10, wherein the invariant image feature comprises one or more of a reciprocal of a distance between two of the projection feature points, an image moment, and an area;

acquiring the rotation vector feature based on the multiple projection feature points comprises:
determining an acceleration direction of the robot based on the multiple projection feature points;
using an angle between the acceleration direction and an x-axis of a robot coordinate system as the rotation vector feature.

12. A mobile robot comprising:
one or more processors;
a memory; and
one or more programs, wherein the one or more programs are stored in the memory and configured to be executed by the one or more processors, the one or more programs comprises:
instructions for acquiring a first image that is captured by a camera on the robot when the robot is in a desired pose;
instructions for acquiring a second image that is captured by the camera on the robot when the robot is in a current pose;
instructions for extracting multiple pairs of matching feature points from the first image and the second image, and projecting the extracted feature points onto a virtual unitary sphere to obtain multiple projection feature points, wherein a center of the virtual unitary sphere is coincident with an optical center of coordinates of the camera;
instructions for acquiring an invariant image feature and a rotation vector feature based on the multiple projection feature points, and instructions for controlling the robot to move until the robot is in the desired pose according to the invariant image feature and the rotation vector feature.

13. The robot of claim 12, wherein controlling the robot to move comprises:
controlling the robot to translate according to the invariant image feature; and
controlling the robot to rotate according to the rotation vector feature.

14. The robot of claim 13, wherein controlling the robot to translate according to the invariant image feature, comprises:
calculating a first angular velocity and a first linear velocity based on the invariant image feature and a preset control model;
controlling the robot to translate according to the first angular velocity and the first linear velocity;
determining whether a translational error is less than a first preset threshold;
going back to a step of acquiring the second image if the translational error is greater than or equal to the first preset threshold; and
controlling the robot to rotate according to the rotation vector feature if the translational error is less than the first preset threshold.

15. The robot of claim 13, wherein controlling the robot to rotate according to the rotation vector feature, comprises:
calculating a second angular velocity and a second linear velocity based on the rotation vector feature and the control model;
controlling the robot to rotate according to the second angular velocity and the second linear velocity;
determine whether an orientation error of the robot after rotation of the robot is less than a second preset threshold;
acquiring a third image by the camera if the orientation error of the robot is greater than or equal to the second preset threshold;
extracting multiple pairs of matching feature points from the first image and the third image, and projecting the extracted feature points onto a virtual unitary sphere to obtain multiple projection feature points; and
acquiring the rotation vector feature based on the multiple projection feature points that are extracted from the first image and the third image, and then going back to a step of calculating the second angular velocity and the second linear velocity based on the rotation vector feature and the control model.

16. The robot of claim 12, wherein the invariant image feature comprises one or more of a reciprocal of a distance between two of the projection feature points, an image moment, and an area.

17. The robot of claim 12, wherein acquiring the invariant image feature based on the multiple projection feature points, comprises:
acquiring at least two of a distance between two of the projection feature points, an image moment, and an area; and
calculating an average value of the at least two of the distance between two of the projection feature points, the image moment and the area, and using the average value as the invariant image feature.

18. The robot of claim 12, wherein acquiring the rotation vector feature based on the multiple projection feature points, comprises:
determining an acceleration direction of the robot based on the multiple projection feature points;
using an angle between the acceleration direction and an x-axis of a robot coordinate system as the rotation vector feature.

19. The robot of claim 12, wherein extracting multiple pairs of matching feature points from the first image and the second image, comprises:
extracting a first number of original feature points from each of the first image and the second image using scale-invariant feature transform; and
acquiring a second number of pairs of matching feature points by comparing and matching the extracted original feature points.

20. The robot of claim 12, further comprising:
controlling the robot to stop at a desired position and in a preset pose; and
using an image of an environment in front of the robot captured by the camera as the first image, wherein the environment in front of the robot comprises at least three feature points.

* * * * *